United States Patent
Uchida et al.

(10) Patent No.: US 9,469,240 B2
(45) Date of Patent: Oct. 18, 2016

(54) APPARATUS FOR CONTROLLING ILLUMINATION RANGE OF VEHICLE LIGHTS

(71) Applicant: DENSO CORPORATION, Kariya, Aichi-pref. (JP)

(72) Inventors: Yuki Uchida, Chita-gun (JP); Tomoyuki Kamitani, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/404,299

(22) PCT Filed: May 28, 2013

(86) PCT No.: PCT/JP2013/064737
§ 371 (c)(1),
(2) Date: Nov. 26, 2014

(87) PCT Pub. No.: WO2013/180111
PCT Pub. Date: Dec. 5, 2013

(65) Prior Publication Data
US 2015/0151670 A1    Jun. 4, 2015

(30) Foreign Application Priority Data
May 28, 2012  (JP) ................ 2012-120963

(51) Int. Cl.
*B60R 22/00*    (2006.01)
*B60Q 1/08*    (2006.01)
*B60Q 1/14*    (2006.01)

(52) U.S. Cl.
CPC ............... *B60Q 1/085* (2013.01); *B60Q 1/143* (2013.01); *B60Q 2300/054* (2013.01);
(Continued)

(58) Field of Classification Search
CPC ............ B60Q 1/085; B60Q 2300/054; B60Q 2300/114
See application file for complete search history.

(56) References Cited

U.S. PATENT DOCUMENTS 2,810,794 A * 10/1957 Brown ................... H01H 13/16
                                                200/332.1
6,049,171 A *  4/2000 Stam ...................... B60Q 1/085
                                                250/208.1

(Continued)

FOREIGN PATENT DOCUMENTS

JP    2002298299 A    10/2002
JP    2007099078 A    4/2007

(Continued)

OTHER PUBLICATIONS

Code of Virginia section "46.2-1034 When dimming headlights required" available online @ http://law.lis.virginia.gov/vacode/46.2-1034/ last accessed Dec. 5, 2015.*

(Continued)

Primary Examiner — Behrang Badii
Assistant Examiner — Daniel L Greene
(74) Attorney, Agent, or Firm — Harness, Dickey & Pierce, P.L.C.

(57) ABSTRACT

A light control system acquires presence information that indicates whether or not another vehicle is present in a lateral or rear direction relative to an own vehicle. If presence information indicates the presence of another vehicle, the illumination range of the headlights of the vehicle is changed so as to be narrower. Thus, when another vehicle enters the illumination range from a lateral direction relative to the vehicle equipped with the system, the illumination range of the lights of the vehicle is changed to a narrower range before the entry into the illumination range.

5 Claims, 3 Drawing Sheets

(52) U.S. Cl.
CPC .. *B60Q 2300/056* (2013.01); *B60Q 2300/338* (2013.01); *B60Q 2300/40* (2013.01); *B60Q 2300/41* (2013.01); *B60Q 2300/43* (2013.01)

(56) References Cited

U.S. PATENT DOCUMENTS

| | | | | |
|---|---|---|---|---|
| 6,587,573 B1* | 7/2003 | Stam | ................ | B60Q 1/085 340/930 |
| 6,831,261 B2* | 12/2004 | Schofield | ................ | B60N 2/002 250/205 |
| 8,493,446 B2* | 7/2013 | Li | ................ | B60Q 1/143 250/205 |
| 2003/0138131 A1* | 7/2003 | Stam | ................ | B60Q 1/085 382/104 |
| 2004/0143380 A1* | 7/2004 | Stam | ................ | B60Q 1/085 701/36 |
| 2006/0177098 A1* | 8/2006 | Stam | ................ | B60Q 1/085 382/104 |
| 2007/0221822 A1* | 9/2007 | Stein | ................ | B60Q 1/143 250/205 |
| 2009/0010494 A1* | 1/2009 | Bechtel | ................ | B60Q 1/1423 382/104 |
| 2012/0116632 A1* | 5/2012 | Bechtel | ................ | B60Q 1/1423 701/36 |

FOREIGN PATENT DOCUMENTS

| | | |
|---|---|---|
| JP | 2010143336 A | 7/2010 |
| JP | 2011037342 A | 2/2011 |

OTHER PUBLICATIONS

International Preliminary Report on Patentability and Written Opinion dated Dec. 11, 2014 in corresponding PCT Application No. PCT/JP2013/064737.

International Search Report (in Japanese with English Translation) for PCT/JP2013/064737, mailed Sep. 3, 2013; ISA/JP.

\* cited by examiner

APPARATUS FOR CONTROLLING ILLUMINATION RANGE OF VEHICLE LIGHTS

CROSS REFERENCE TO RELATED APPLICATIONS

This application is a U.S. National Phase Application under 35 U.S.C. 371 of International Application No. PCT/JP2013/064737 filed on May 28, 2013 and published in Japanese as WO 2013/180111 A1 on Dec. 5, 2013. This application is based on and claims the benefit of priority from Japanese Patent Application No. 2012-120963 filed May 28, 2012. The entire disclosures of all of the above applications are incorporated herein by reference.

BACKGROUND

1. Technical Field

The present invention relates to an apparatus for controlling an illumination range of vehicle lights and a method thereof, and in particular to an apparatus for controlling an illumination range of a vehicle headlight and a method thereof.

2. Background Art

Various types of apparatus are known as vehicle light control apparatus. For example, in an apparatus disclosed in Patent Literature 1, a field of view ahead of the vehicle is picked up by a camera and it is determined whether or not another vehicle is present in the region of the field of view. Further, when the other vehicle is determined to be present, the illumination range of the headlights is changed so as to be narrowed.

Patent Literature 1 JP-A-2011-037342

However, the light control apparatus described in Patent Literature 1 mentioned above still has a problem to be solved. For example, when another vehicle runs past the vehicle equipped with the light control apparatus (hereinafter just referred to as the vehicle), such as when the vehicle is overtaken by the other vehicle, the problem arises. Specifically, when another vehicle runs past the vehicle and pulls in front of the vehicle (enters the illumination range of the headlights), the illumination range of the headlights is changed to a narrow range after the other vehicle has actually pulled in front of the vehicle. Therefore, there is a delay in controlling the illumination range of the headlights and thus the driver of the other vehicle may be dazzled.

SUMMARY

In light of such a problem, the light control apparatus that controls the illumination range of the headlights is also desired to suppress or prevent dazzling of the driver of another vehicle such as another vehicle overtakes the vehicle and then enters the illumination range of the headlights.

In a light control apparatus related to a typical example, a vehicle information acquiring means acquires presence information that indicates information as to whether or not another vehicle is present in a lateral or rear direction relative to the vehicle (equipped with the light control apparatus); and an illumination range changing means changes the illumination range of the headlights (hereinafter also simply referred to as "illumination range") to a narrower range when presence information indicating presence of the other vehicle is acquired.

According to the light control apparatus, the illumination range is made narrower before the other vehicle enters the illumination range sideways. Accordingly, the driver of the other vehicle is suppressed or prevented from being dazzled. It should be noted that the expression "when presence information indicating presence of the other vehicle is acquired" in the present disclosure includes "when presence information is acquired" in which the information as to the presence of another vehicle is absent, in a configuration in which presence information is acquired only when another vehicle is present in a lateral or rear direction relative to the vehicle equipped with the light control apparatus.

For example, in the light control apparatus, the vehicle information acquiring means also acquires relative travel directions of the vehicle equipped with the apparatus and the other vehicle, in addition to the presence information; and the illumination range changing means changes the illumination range of the headlights to a narrower range when the other vehicle is estimated to move into the illumination range, on the basis of the relative travel direction.

According to the light control apparatus, the illumination range is changed to a narrow range only when another vehicle moves into the illumination range. Therefore, unless another vehicle moves into the illumination range, a wider field of view can be ensured.

The problem set forth above can also be solved by a system or a program having the above configuration.

DESCRIPTION OF EMBODIMENTS

With reference to the drawings, hereinafter is described a light control system implementing an apparatus and a method related to an embodiment of the resent invention.

Figure 1:
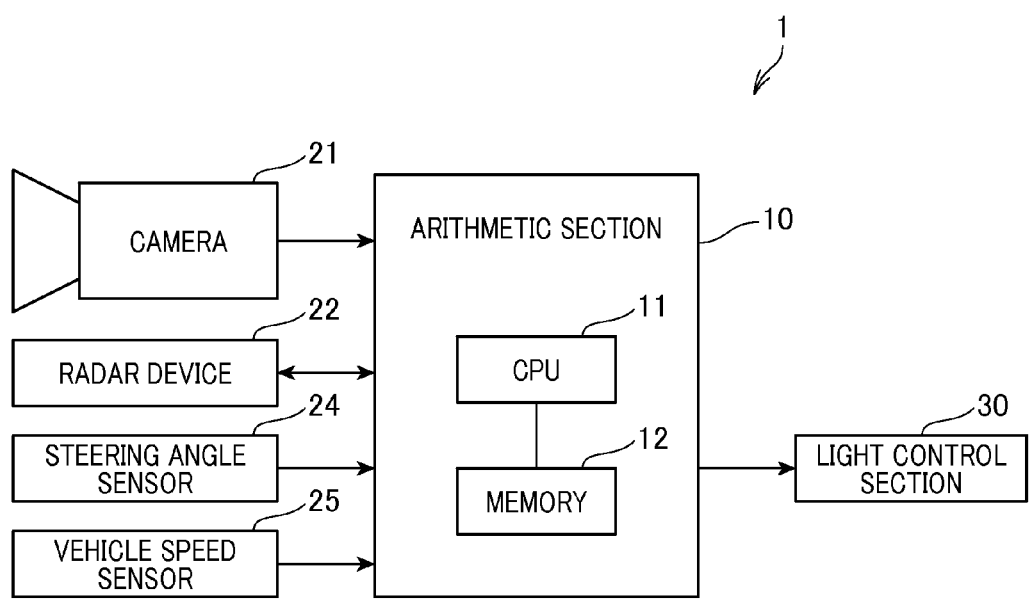
FIG. 1 is a block diagram illustrating a schematic of a light control system.

FIG. 1 shows a schematic of a light control system 1. As shown in the figure, the light control system 1 is mounted to a vehicle, such as a passenger car, and has a function of changing an illumination range of the headlights of the vehicle. Specifically, as shown in FIG. 1, the light control system 1 includes an arithmetic section 10, camera 21, radar device 22, steering angle sensor 24, vehicle speed sensor 25 and light control section 30.

It should be noted that the vehicle equipped with the light control system 1 related to the present embodiment is referred to as the own vehicle, i.e., the system-equipped vehicle, as necessary, for distinction from another (or different) vehicle.

The camera 21 is arranged so that its imaging range includes at least an illumination range of the headlights in the travel direction of the vehicle (ahead of the vehicle in particular). The camera 21 is configured as a color camera that picks up an image in color in the field of view of the imaging range. The camera 21 transmits a picked-up image to the arithmetic section 10.

The radar device 22 is configured as a well-known radar device having a function of radiating laser beams, or electromagnetic waves, such as radio waves, or sonic waves and detecting the reflected waves to detect a distance to an object that has reflected the electromagnetic waves or the sonic waves and a position of the object. The radar device 22 is arranged at each of corner portions in the right-rear and left-rear sections of the vehicle, and emits electromagnetic waves or sonic waves so that a targeted detection region is created in the lateral and rear directions relative to the vehicle. Then, the radar device 22 transmits a detection result of an object to the arithmetic section 10.

The steering sensor 24 is configured as a well-known steering angle sensor that detects a steering angle of a vehicle. The vehicle speed sensor 25 is configured as a well-known vehicle sensor that detects a travel speed of a vehicle.

The light control section 30 controls the optical axes of the headlights upon reception of a detection result of vehicle light. Specifically, upon reception of a detection result that vehicle light is present in a picked-up image, the light control section 30 switches the headlights to low beam, and upon reception of a detection result that no vehicle light is present in a picked-up image, the light control section 30 switches the headlights to high beam. It should be noted that the light control section 30 may have a configuration in which the optical axes are moved to a direction where no other vehicle is present (e.g., downward or leftward) according to an instruction from the arithmetic section 10.

The arithmetic section 10 is configured as a well-known microcomputer that includes a CPU 11 and a memory 12, such as ROM (serving as a non-transitory computer readable medium) and RAM. The arithmetic section 10 performs various processes, such as an illumination control process discussed later, on the basis of programs (including a light control program) stored in the memory 12. The memory 12 stores parameters that indicate characteristics of vehicle light (including values correlated to the parameters of positions, such as size, color and height, and distances between paired lights and behaviors thereof), and parameters that indicate characteristics of light sources other than vehicles. It should be noted that the parameters stored in the memory 12 are used in detecting the light sources indicating vehicle light from a picked-up image, being distinguished from the light sources other than vehicle light.

Figure 2:
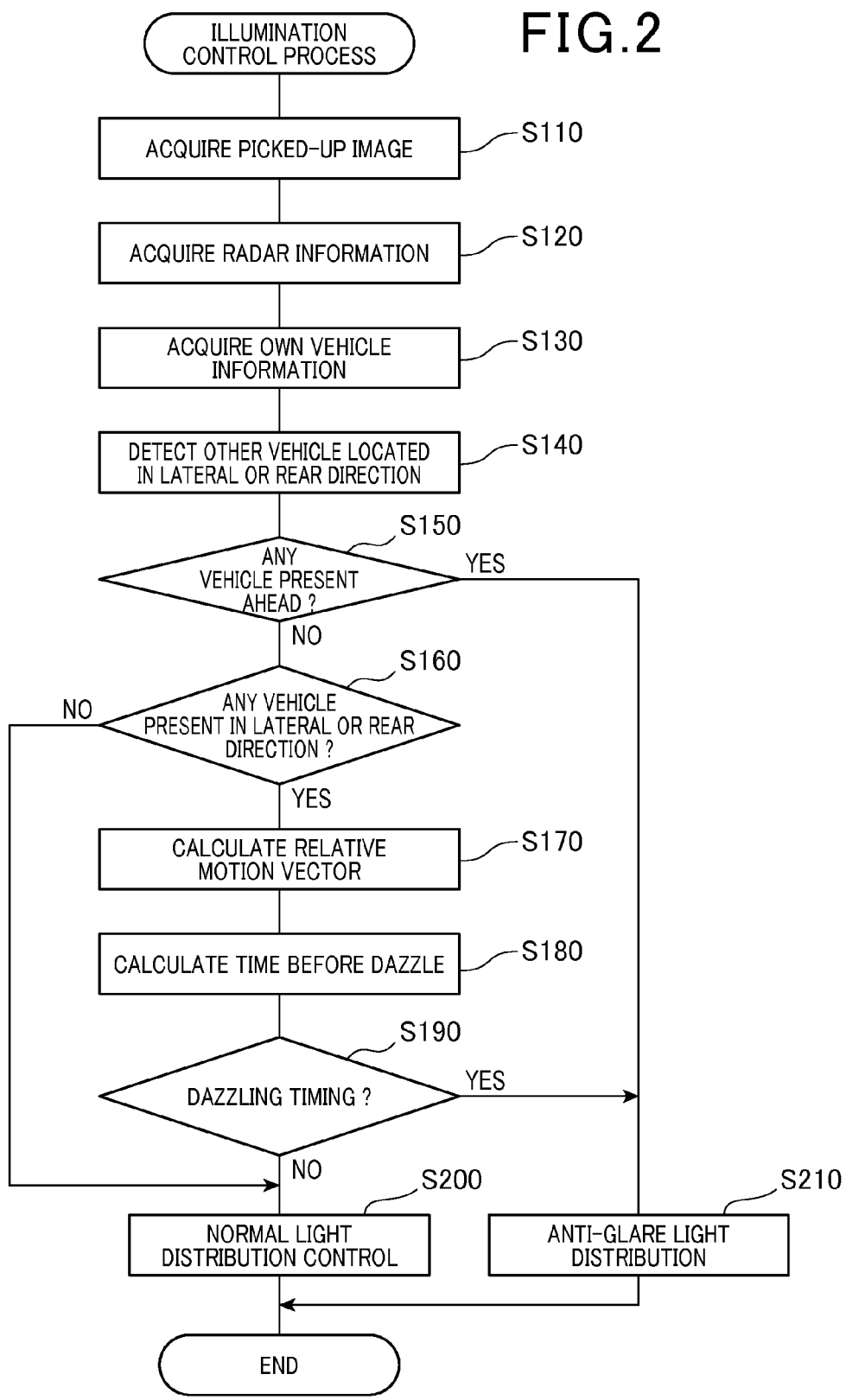
FIG. 2 is a flow chart illustrating an illumination control process performed by an arithmetic section (CPU)

The arithmetic section 10 (CPU 11) detects another vehicle which is present around the own vehicle. When there is a probability that the driver of the other vehicle is dazzled, the CPU 11 repeatedly performs, at predetermined intervals, the illumination control process for narrowing the illumination range of the headlights (switching the headlights to low beam). As shown in FIG. 2, in the illumination control process, a picked-up image is firstly acquired by the camera 21 (step S110).

Subsequently, the CPU 11 acquires, from the radar device 22, information on an object (position and distance) detected by the radar device 22 (step S120). At the same time, the CPU 11 acquires information on the own vehicle that is equipped with the light control system 1 (step S130). The information on the own vehicle corresponds such as to a steering angle detected by the steering sensor 24, and a vehicle speed detected by the vehicle speed sensor 25.

Then, the CPU 11 detects information of another vehicle which is present in the lateral and rear directions relative to the own vehicle (step S140). Specifically, the CPU 11 detects the shape of an object detected by the radar device 22 (detects what can be estimated from a collection of pieces of position information) and records the detection in the memory 12 as another vehicle. It should be noted that another vehicle detected in the previous and the further preceding cycles, even if the other vehicle is not detected in the present-time process, is recorded in the memory 12 as having moved according to a relative motion vector and regarded to have been detected.

In this process, when an object can be estimated as being a vehicle on the basis such as of the shape and size, the CPU 11 specifies the positions corresponding to dazzling objects from among the portions of the other object. The dazzling objects each indicate a portion of the other vehicle by which the driver of the other vehicle, when it has entered the illumination range, is likely to be dazzled. The positions of the dazzling objects include, for example, those of sideview mirrors, a rearview mirror and a rear window (the window in the rear of the vehicle). When the positions of the dazzling objects cannot be specified from the shapes and the like, the positions where the dazzling objects are arranged in generally-used vehicles are recorded on the memory 12 as the positions of the dazzling objects of the other vehicle, with reference to the location of the other vehicle.

Then, the CPU 11 processes the picked-up image to determine whether or not another vehicle is present ahead of the own vehicle (step S150). At this step, the CPU 11 makes use of a well-known image processing technique of extracting light sources from a picked-up image and detecting vehicle light from the light sources to thereby determine whether or not another vehicle is present in the picked-up image. In making the determination, the CPU 11 uses the parameters stored in the memory 12, which indicate the characteristics of vehicle light, or the parameters which indicate the characteristics of the light sources other than those of vehicles.

If another vehicle is present in a forward direction (YES at step S150), the CPU 11 sends an output to the light control section 30 (step S210). The output indicates that the illumination range of the headlights should be switched to antiglare light distribution (light distribution of low beam) which is narrower than the normal illumination range (normal light distribution of high beam). Then, the illumination control process is terminated.

If no different vehicle is present in a forward direction (NO at step S150), the CPU 11 determines whether or not another vehicle is present in a lateral or rear direction (step S160). If no different vehicle is present in the lateral or rear direction (NO at step S160), the CPU 11 sends an output to the light control section 30, the output indicating that the illumination range should be switched to the normal light distribution (step S200). Then, the illumination control process is terminated.

If another vehicle is present in the lateral or rear direction (YES at step S160), the CPU 11 calculates a relative motion vector (step S170). Specifically, the CPU 11 tracks, in a time-series manner, the information on the shape and position of an object detected by the radar device 22 to detect a relative motion vector (presence/absence information, position of presence, relative travel direction and relative speed) that is a motion vector for an object as a vehicle which is estimated to be another vehicle, and records the relative motion vector on the memory 12. However, steps S170 and S180 only have to be performed for different vehicles which are detected by the radar device 22 in the present-time process.

Then, the CPU 11 calculates time that will be taken before the driver of the other vehicle located in the lateral or rear direction relative to the own vehicle is dazzled by the headlights of the own vehicle (step S180). While the illumination range of the headlights in the normal light distribution is recorded in advance on the memory 12, the CPU 11 calculates, at this step, the time (moving time period) taken for the other vehicle (any one of the dazzling objects in particular) to enter the illumination range when the other vehicle moves along the relative motion vector mentioned above.

Figure 3:
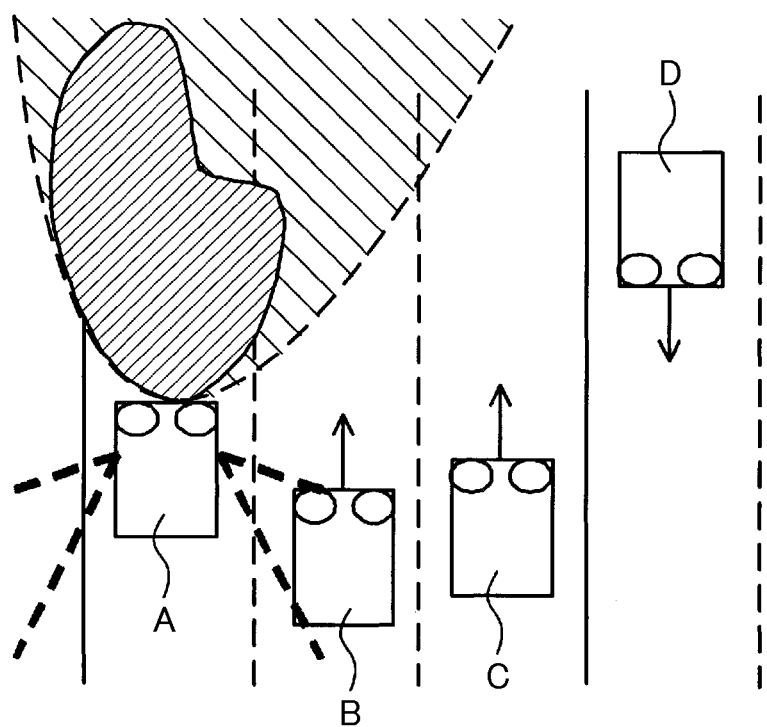
FIG. 3 is a bird's eye view illustrating vehicles to explain a specific example in calculating a moving time period.

For example, let us assume a situation, as shown in FIG. 3, where the own vehicle A equipped with the light control system 1 travels on the left lane of a three-lane road, and another vehicle B traveling on the center line and another vehicle C traveling on the right lane run past the vehicle A. In this situation, the distance to an entry point into the illumination range (the hatched range inside the broken line) is longer for the other vehicle C than for the other vehicle B. This is because the distance from the vehicle A to the other vehicle C is larger than that to the other vehicle B in the lateral direction relative to the vehicle A, i.e., perpendicular to the travel direction of the vehicle A.

Accordingly, moving time periods set at the present step (step S180) depend on the positions of the other vehicles (in the lateral directions), although the relative travel speeds are the same. Specifically, a longer moving time period is set as the lateral distance from the own vehicle to another vehicle becomes larger (the same applies to a wait time period discussed later).

Then, it is determined whether or not the timing has come at which the driver of another vehicle is dazzled (step S190). At this step, the CPU 11 sets, first, the wait time period with a value equal to or slightly smaller than the time taken for the other vehicle to enter the illumination range. Then, the CPU 11 determines, for each of the other vehicles recorded on the memory 12, whether or not the wait time period has elapsed since step S180 has been performed last.

If the timing has come at which the driver of another vehicle is dazzled (YES at step S190), control proceeds to step S210 mentioned above. On the other hand, if the timing has not come (NO at step S190), control transfers to step S200 mentioned above.

In the light control system 1 described in detail in the above, the arithmetic section 10 acquires the presence information that indicates whether or not another vehicle is present in the lateral or rear direction relative to the own vehicle (steps S120, S140 and S170). If the presence information indicating the presence of another vehicle is acquired, the illumination range of the headlights is changed to a narrower range (steps S160 to S210).

According to the light control system 1, the illumination range is controlled to a narrower range prior to the entry of another vehicle into the illumination range from the lateral direction relative to the own vehicle. Thus, the driver of the other vehicle is prevented or suppressed from being dazzled.

Further, in the light control system 1, the arithmetic section 10 acquires not only the presence information but also relative travel directions of another vehicle and the own vehicle. Then, if the entry of the other vehicle into the illumination range is estimated from the relative travel direction (if the relative travel direction of the other vehicle coincides with the direction of the illumination range), the illumination range of the headlights is changed to a narrower range.

According to the light control system 1, the illumination range is controlled to a narrower range only when another vehicle moves into the illumination range. Accordingly, unless another vehicle moves into the illumination range, a wider field of view is ensured.

Further, in the light control system 1, the arithmetic section 10 acquires not only the presence information but also a relative motion vector of another vehicle with respect to the own vehicle, followed by estimating a moving time period for the other vehicle to enter the illumination range, on the basis of the relative motion vector. Then, a wait time period is set using the moving time period as being an upper limit. Then, after lapse of the wait time period, the illumination range of the headlights is changed to a narrower range. The start point for measuring the wait time period is set, for example, to a point when the relative motion vector is acquired or when the moving time period is estimated. In calculating the wait time period, the arithmetic section 10 acquires a distance to another vehicle in a lateral direction (lateral distance) that is perpendicular to the travel direction of the own vehicle, and makes the wait time period longer as the lateral distance becomes larger.

According to the light control system 1, the illumination range is prevented from being narrowed as much as possible, unless the driver of another vehicle is dazzled. Thus, in such a situation, a wider field of view can be ensured.

Further, in the light control system 1, the arithmetic section 10 also acquires the positions of the dazzling objects (sideview mirrors, a rearview mirror and a rear window (the window in the rear of the vehicle)) from among portions of another object. The dazzling objects each indicate a portion by which the driver of the other vehicle, when it has entered the illumination range, is likely to be dazzled. Then, the arithmetic section 10 estimates the moving time period that indicates time before a dazzling object of the other vehicle enters the illumination range.

According to the light control system 1, the time taken for the own vehicle to dazzle the driver of another vehicle can be correctly detected.

OTHER EMBODIMENTS

The present invention should not be construed as being limited to the foregoing embodiment, but may have various modes as far as the modes are in the technical scope of the present invention.

For example, the foregoing embodiment is configured to detect a relative motion vector (present location, relative travel direction and relative speed) of another vehicle located in the lateral or rear direction relative to the own vehicle, using the radar device 22. Alternatively, in another configuration, the camera 21 may be arranged being oriented to the rear or lateral direction relative to the own vehicle and a relative motion vector of another vehicle may be detected from a picked-up image. Alternatively, information regarding a (absolute) motion vector of another vehicle may be received using vehicle-to-vehicle communication, for example, and a difference from the motion vector of the own vehicle may be calculated to thereby calculate a relative motion vector.

Further, in the foregoing embodiment, the illumination range of the headlights is ensured to be changed after lapse of the wait time period. Alternative to this, the illumination range may be immediately changed at the time point when another vehicle is detected in the rear or lateral direction, without providing the wait time period. Further, in the foregoing embodiment, the illumination range is change according to the relative motion vector. Alternatively, the illumination range may be changed according to a relative travel speed or a relative travel direction instead of the relative motion vector.

In the illumination control process of the present embodiment, steps S120, S140 and S170 correspond to the vehicle information acquiring means, while steps S160 to S210 correspond to the illumination range changing means.

REFERENCE SIGNS LIST

1 . . . Light control system,
10 . . . Arithmetic section,

12 . . . Memory,
21 . . . Camera,
22 . . . Radar device,
24 . . . Steering angle sensor,
25 . . . Vehicle speed sensor, and
30 . . . Light control section.

What is claimed is:

1. A vehicle light control apparatus that is mounted to a controlled vehicle and controls an illumination range of headlights of the controlled vehicle, the vehicle light control apparatus comprising:
   a processor, the processor including
      means for acquiring presence information that indicates information as to whether or not another vehicle is present in a lateral or rear direction relative to the vehicle; and
      means for changing the illumination range of the headlights to a narrower range when the acquiring means acquire presence information indicating presence of the another vehicle,
   wherein
   the acquiring means is configured to acquire a relative motion vector indicating relative travel directions between the another vehicle and the controlled vehicle, in addition to the presence information, and
   the changing means i) estimate a first time period that indicates an amount of time for the another vehicle to enter the illumination range, on the basis of the relative motion vector, the first time period depending on where the another vehicle is present in the lateral or rear direction, and ii) change the illumination range of the headlights to a narrower range after lapse of a wait time period that is set with the first time period as being an upper limit.

2. The apparatus according to claim 1, wherein:
   the acquiring means is configured to also acquire dazzling objects from among portions of the another vehicle, the dazzling objects each being a portion having a probability of dazzling the driver of the another vehicle when the another vehicle has entered the illumination range; and
   the changing means is configured to estimate a second time period that indicates time taken for each of the dazzling objects of the another vehicle to enter the illumination range.

3. The apparatus according to claim 1, wherein the changing means is configured to:
   specify a position of a dazzling object in the other vehicle based on the presence information of the other vehicle; and
   estimate, as the first time period, an amount of time for the dazzling object of the other vehicle to enter the illumination range of the headlights.

4. A light control program that allows a non-transitory computer readable medium to control the processor to function as the acquiring means and the changing means that configure the vehicle light control apparatus recited in claim 1; wherein
   the vehicle light control apparatus in communication with the changing means and the headlights, the vehicle light control apparatus changing the illumination range of the headlights.

5. A method for controlling an illumination range of headlights of a controlled vehicle, the method comprising:
   acquiring i) presence information indicates information as to whether or not another vehicle is present in a lateral or rear direction relative to the controlled vehicle and ii) a relative motion vector indicating relative travel directions between the another vehicle and the controlled vehicle using a vehicle light control apparatus;
   estimating a time period that indicates an amount of time for the another vehicle to enter the illumination range, on the basis of the relative motion vector, when the presence information is acquired, the time period depending on where the another vehicle is present in the lateral or rear direction using the vehicle light control apparatus; and
   changing the illumination range of the headlights to a narrower range after lapse of a wait time period that is set with the time period as being an upper limit using the vehicle light control apparatus; wherein
   the vehicle light control apparatus is in communication with the changing means and the headlights.

* * * * *